Oct. 19, 1948.  W. P. POWERS  2,451,972
OPTICAL INDICATOR HAVING COOPERATING GRIDS
Filed Dec. 3, 1945
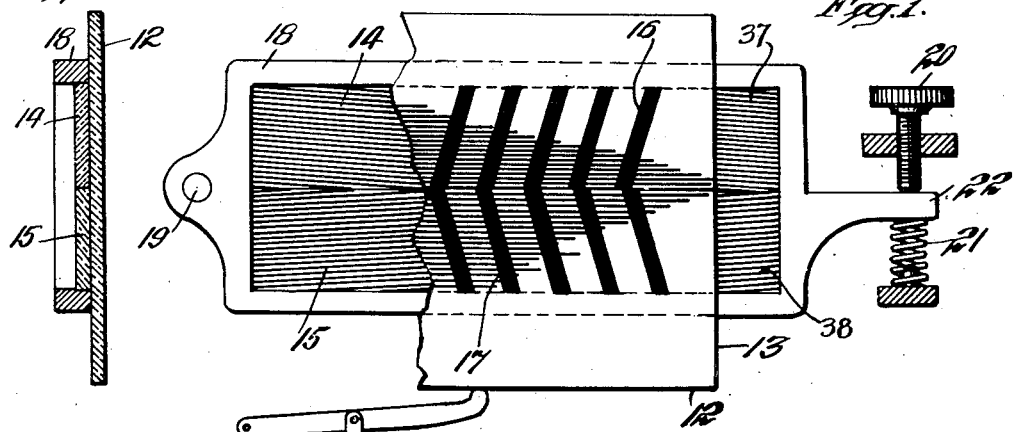
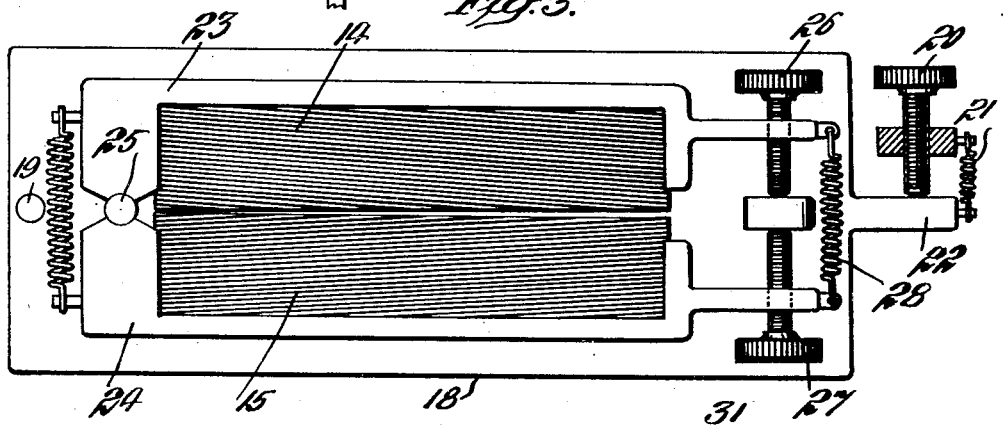
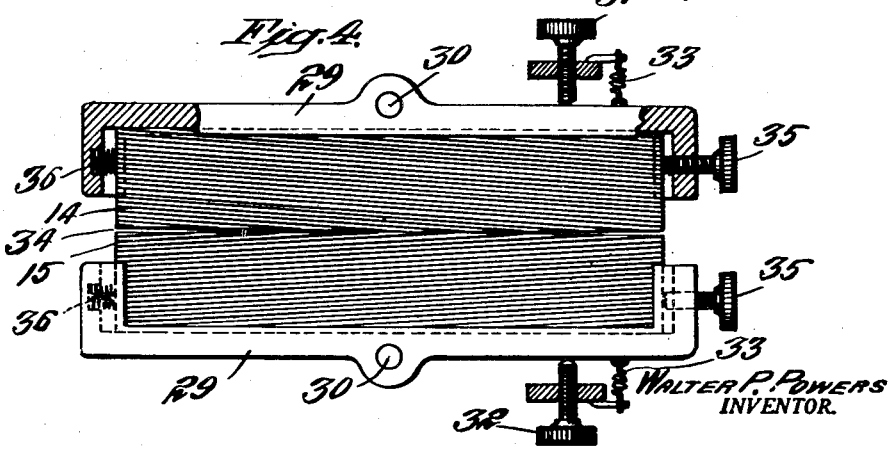
Walter P. Powers
INVENTOR.
BY
ATTORNEY Patented Oct. 19, 1948

2,451,972

UNITED STATES PATENT OFFICE 2,451,972

OPTICAL INDICATOR HAVING COOPERATING GRIDS

Walter P. Powers, Spring Lake, N. J., assignor to Associated Patentees, Inc., Ampere, N. J., a corporation of New Jersey Application December 3, 1945, Serial No. 632,417

5 Claims. (Cl. 88—1)

The invention herein disclosed relates to instruments in the nature of gages, for measuring, comparing, indicating and the like and is a continuation in part of the invention disclosed in copending application Serial No. 479,543 filed March 18, 1943, now Patent No. 2,390,122 of December 4, 1945.

The invention is based on the principle disclosed in that patent and involves the attainment of larger and more easily read indications from relatively slight variations through the medium of grids or screens lined and arranged to create phantom or shadow pointers.

Attention is directed to earlier patents of Walter P. Powers Nos. 2,246,001 and 2,246,002 dated June 17, 1941, and No. 2,360,581 dated October 17, 1944, for more complete consideration of such basic principles.

The purposes of the present invention are to provide a gage device operating on the principles referred to but which will have capabilities for greater ranges of use and operation but which withal will be of relatively simple design and construction.

Particularly it is an object of the present invention to make it possible to quickly and easily bring the grids which cooperate to produce the phantom indicating pointers into register or proper angular relation to produce and maintain accurate results.

Other desirable objects attained by the invention will appear as the specification proceeds.

The novel features of the invention through which attainment of all objects is effected are set forth in the following specification, illustrated in the accompanying drawing and broadly covered in the claims.

In the drawing there are shown several different practical embodiments but it is realized that structure may be further modified and changed, all within the true intent and broad scope of the invention as hereinafter defined and claimed.

Fig. 1 in the drawing is a broken front view showing the invention embodied in the form of a comparator;

Fig. 2 is an edge view of the lined grids taken as on substantially the plane of line 2—2 of Fig. 1;

Figs. 3 and 4 are broken front views illustrating other embodiments of the invention.

The comparator embodiment of the invention illustrated in Fig. 1, is like that of Patent 2,390,122 to the extent that a lined grid or screen 12 with equally spaced parallel lines and spaces 37 is slidingly guided at 13 over the face of convergently lined, abutting or substantially abutting grids or screens 14, 15 each having equally spaced parallel lines and spaces 38, 39.

These three screens, as in Patent No. 2,390,122 on which the present invention is based, may be alike in having the same arrangement of equally spaced lines and spaces and the effect produced thereby may be, as in the patent, to create the optical effect of two convergent larger mesh grids or scales 16, 17, inclined reversely to the lines 37, 38, of the convergently disposed back grids 14, 15.

These larger and heavier convergent shadow grids or scales 16, 17, may meet exactly to create a chevron or herringbone effect or, as indicated in Fig. 1, there may be a vernier relation between the two scales so that the lines will meet exactly only at one point.

While it is possible to create this vernier relation by having a slight variation in the size and spacing of the lines on the front grid relative to one of the back grids or by spacing the grids away from each other sufficiently to create a slight angularity in viewing one through the other, as disclosed in the basic patent, the present invention involves the more positive method of attaining such results by joint, individual or combinations of joint and individual adjustments of the screens.

In Figs. 1 and 2, the two back screens 14 and 15 are mounted with their opposing edges in abutting engagement and with the convergent lines 37, 38, of the grids exactly coinciding at the meeting line. This is a feasible arrangement, particularly when the lined grids are produced on a glass or plastic base, as such glass can be ground to an accurate edge fit.

These two back grids in the accurately aligned relation shown and described are fixedly held, in this first embodiment, in a frame 18 pivotally supported at one end at 19 and adjustably supported at the opposite end by screws 20 and opposing spring 21 acting on the extension lug 22 of the frame.

This end mounting and adjustment affords leverage so that slight adjustments of screw 20 will effect quite appreciable adjustments in the greatly enlarged vernier screens 16, 17, produced as a result of the two screens 14, 15, behind the overlying, adjustable front screen 12.

Fig. 3 illustrates a modification in which unitary or joint adjustment of the back screens may be supplemented or be substituted by individual, relatively angular adjustment of those screens. There the main frame 18 is angularly adjustable as before but the screens 14, 15, are individually mounted in sub-frames 23, 24, pivoted at one end on the main frame at 25 and individually adjustable by thumb screws 26, 27, against the tension of a spring 28. The opposing edges of the glass screens 14, 15 in this instance may be in abutting or approximate engagement and may be straight or slightly curved.

The embodiment shown in Fig. 4 illustrates the point that the grids may be pivotally supported more or less centrally, instead of at one end. In this view grids 14, 15, are shown carried by frames 29 pivoted mid-length at 30 and independently adjustable by screws 31, 32, against counterbalancing springs 33.

In this view the abutting edges of the screens are shown as curved or cam shaped at 34 to meet with a rolling engagement and the screens are individually adjustable longitudinally in their frames through the medium of end screws 35 and counter-pressure springs 36.

The joint and/or independent adjustment of the two back screens in respect to each other and in respect to the movable front screen enables determination of the angle of the reversely inclined shadow grids 16, 17, the bringing of these to the same angle of inclination so as to register or throw them into a desired vernier relation and the attainment of other desired results.

In all forms of the invention the grids may be made readily removable so that differently lined grids may be quickly substituted.

In the Figs. 1 and 3 forms of the invention the grids may be set friction tight in their supporting frames so that they can be easily taken out and one substituted for another. The same results are possible in the Fig. 4 form of the invention.

While shown as applied to a comparator, it will be apparent that the invention may be put to use in many different applications.

By having all three grids of the same pitch, costs of production are kept down and an added advantage in operation is attained in that motion of the shadow grids is at right angles to the motion producing the same.

What is claimed is:

1. An instrument of the character disclosed comprising companion light screens in closely superposed relation and relatively movable, one over the face of the other, one of said screens being composed of two coplanar grids in edge-to-edge relation and the other screen consisting of a single grid overlying and cooperative with both the grids of the first mentioned screen, each of the three grids being composed of equally spaced parallel opaque lines and intermediate clear spaces and the two coplanar grids arranged in non-parallel, divergent relation to cause portions of the lines and spaces of the single grid to coincide periodically at regularly recurrent intervals with portions of the lines and spaces of the other two grids to align parts of the superimposed grids to form two contiguous convergent larger mesh apparent scales of more widely spaced, wider lines in opposed edge-to-edge relation, means for effecting relatively fine adjustments of the two grids forming the one screen in respect to the other screen to thereby regulate said larger mesh apparent scales and means for effecting relative shifting of said light screens, one over the face of the other, to produce magnified travel of the apparent scales so produced by said regulation, said regulating means comprising a common support for both grids of the two-grid screen, said support being in the form of a single frame pivotally mounted at one end and there being means for effecting fine adjustments of the opposite end of said support on its pivotal mounting to thereby effect simultaneous and similar adjustment of both said two grids in respect to the single grid.

2. An instrument of the character disclosed comprising companion light screens in closely superposed relation and relatively movable, one over the face of the other, one of said screens being composed of two coplanar grids in edge-to-edge relation and the other screen consisting of a single grid overlying and cooperative with both the grids of the first mentioned screen, each of the three grids being composed of equally spaced parallel opaque lines and intermediate clear spaces and the two coplanar grids arranged in non-parallel, divergent relation to cause portions of the lines and spaces of the single grid to coincide periodically at regularly recurrent intervals with portions of the lines and spaces of the other two grids to align parts of the superimposed grids to form two contiguous convergent larger mesh apparent scales of more widely spaced, wider lines in opposed edge-to-edge relation, means for effecting relatively fine adjustments of the two grids forming the one screen in respect to the other screen to thereby regulate said larger mesh apparent scales and means for effecting relative shifting of said light screens, one over the face of the other, to produce magnified travel of the apparent scales so produced by said regulation, said regulating means including mechanism for effecting both bodily angular adjustment of said two-grid screen in respect to the other screen and relative angular adjustment of the two grids composing said two-grid screen.

3. An instrument of the character disclosed comprising companion light screens in closely superposed relation and relatively movable, one over the face of the other, one of said screens being composed of two coplanar grids in edge-to-edge relation and the other screen consisting of a single grid overlying and cooperative with both the grids of the first mentioned screen, each of the three grids being composed of equally spaced parallel opaque lines and intermediate clear spaces and the two coplanar grids arranged in non-parallel, divergent relation to cause portions of the lines and spaces of the single grid to coincide periodically at regularly recurrent intervals with portions of the lines and spaces of the other two grids to align parts of the superimposed grids to form two contiguous convergent larger mesh apparent scales of more widely spaced, wider lines in opposed edge-to-edge relation, means for effecting relatively fine adjustments of the two grids forming the one screen in respect to the other screen to thereby regulate said larger mesh apparent scales and means for effecting relative shifting of said light screens, one over the face of the other, to produce magnified travel of the apparent scales so produced by said regulation, said regulating means including adjustable support means in which the grids of the two-grid screen are removably and replaceably mounted and whereby grids of the same or different characteristics may be readily combined in the two-grid screen.

4. An instrument of the character disclosed comprising companion light screens in closely superposed relation and relatively movable, one over the face of the other, one of said screens being composed of two coplanar grids in edge-to-edge relation and the other screen consisting of a single grid overlying and cooperative with both the grids of the first mentioned screen, each of the three grids being composed of equally spaced parallel opaque lines and intermediate clear spaces and the two coplanar grids arranged in non-parallel, divergent relation to cause portions of the lines and spaces of the single grid to coincide periodically at regularly recurrent intervals with portions of the lines and spaces of the other two grids to align parts of the superimposed grids to form two contiguous convergent larger mesh apparent scales of more widely spaced, wider lines in opposed edge-to-edge relation, means for effecting relatively fine adjustments of the two grids forming the one screen in respect to the other screen to thereby regulate said larger mesh apparent scales and means for effecting relative shifting of said light screens, one over the face of the other, to produce magnified travel of the apparent scales so produced by said regulation, said regulating means including supporting means for the grids of the two-grid screen and means for effecting fine, relatively longitudinal adjustments of said two grids in said supporting means.

5. An instrument of the character disclosed comprising companion light screens in closely superposed relation and relatively movable, one over the face of the other, one of said screens being composed of two coplanar grids in edge-to-edge relation and the other screen consisting of a single grid overlying and cooperative with both the grids of the first mentioned screen, each of the three grids being composed of equally spaced parallel opaque lines and intermediate clear spaces and the two coplanar grids arranged in non-parallel, divergent relation to cause portions of the lines and spaces of the single grid to coincide periodically at regularly recurrent intervals with portions of the lines and spaces of the other two grids to align parts of the superimposed grids to form two contiguous convergent larger mesh apparent scales of more widely spaced, wider lines in opposed edge-to-edge relation, means for effecting relatively fine adjustments of the two grids forming the one screen in respect to the other screen to thereby regulate said larger mesh apparent scales and means for effecting relative shifting of said light screens, one over the face of the other, to produce magnified travel of the apparent scales so produced by said regulation, said grids of the two-grid screen meeting in abutting edge-to-edge engagement and said regulating means including mechanism for effecting relative rocking adjustments of said grids about the point of abutting engagement.

WALTER P. POWERS.

REFERENCES CITED

The following references are of record in the file of this patent:

UNITED STATES PATENTS

| Number | Name | Date |
| --- | --- | --- |
| 1,800,044 | Baird | Apr. 7, 1931 |
| 2,256,170 | Powers | Sept. 16, 1941 |
| 2,280,038 | Powers | Apr. 14, 1942 |
| 2,360,581 | Powers | Oct. 17, 1944 |
| 2,390,122 | Powers | Dec. 4, 1945 |